United States Patent
Naik Raikar

(10) Patent No.: US 9,473,802 B2
(45) Date of Patent: Oct. 18, 2016

(54) PROVIDING UN-INTERRUPTED PROGRAM VIEWING EXPERIENCE DURING SATELLITE SIGNAL INTERRUPTIONS

(71) Applicant: SLING MEDIA PVT LTD., Banglore (IN)

(72) Inventor: Yatish Jayant Naik Raikar, Bangalore (IN)

(73) Assignee: Sling Media PVT Ltd., Bangalore (IN)

( * ) Notice: Subject to any disclaimer, the term of this patent is extended or adjusted under 35 U.S.C. 154(b) by 0 days.

(21) Appl. No.: 14/585,865

(22) Filed: Dec. 30, 2014

(65) Prior Publication Data

US 2015/0189346 A1    Jul. 2, 2015

Related U.S. Application Data

(60) Provisional application No. 61/922,177, filed on Dec. 31, 2013.

(51) Int. Cl.
| | |
|---|---|
| *H04N 21/2665* | (2011.01) |
| *H04N 21/2662* | (2011.01) |
| *H04N 21/2343* | (2011.01) |
| *H04H 20/22* | (2008.01) |
| *H04H 20/20* | (2008.01) |
| *H04H 40/90* | (2008.01) |

(Continued)

(52) U.S. Cl.
CPC .......... *H04N 21/2662* (2013.01); *H04H 20/20* (2013.01); *H04H 20/22* (2013.01); *H04H 20/24* (2013.01); *H04H 40/90* (2013.01); *H04H 60/11* (2013.01); *H04N 21/2343* (2013.01); *H04N 21/23439* (2013.01); *H04N 21/234336* (2013.01); *H04N 21/2407* (2013.01); *H04N 21/44008* (2013.01); *H04N 21/44029* (2013.01); *H04N 21/44209* (2013.01); *H04N 21/4621* (2013.01); *H04N 21/4622* (2013.01); *H04N 21/6112* (2013.01); *H04N 21/6143* (2013.01); *H04N 21/6193* (2013.01); *H04N 21/6338* (2013.01)

(58) Field of Classification Search
CPC .................... H04N 21/2665; H04N 21/4622
See application file for complete search history.

(56) References Cited

U.S. PATENT DOCUMENTS

| | | | | |
|---|---|---|---|---|
| 4,331,977 A | * | 5/1982 | Cohn ........................ | H04N 5/63 348/725 |
| 2001/0034764 A1 | * | 10/2001 | Nishiura ................ | H04H 20/24 709/204 |

(Continued)

OTHER PUBLICATIONS

European Patent Office, Communication and Extended European Search Report for European Patent Application No. 14 197 897.3-1905 mailed May 7, 2015.

*Primary Examiner* — Robert Hance
(74) *Attorney, Agent, or Firm* — LK Global

(57) ABSTRACT

Systems, devices and methods are described to obtain a lower-quality replacement when the reception of a direct broadcast satellite (DBS) or other broadcast television signal becomes weak or unavailable due to weather, maintenance or other circumstances. The received broadcast television signal is monitored by a receiver, antenna, outdoor unit or the like. When the received broadcast signal becomes weak or unavailable, the television receiver obtains a lower quality replacement for received broadcast signal from a network service or other alternate source to thereby continue the playback of the television program. Lower quality alternatives may include lower quality video streams, audio streams, text tickers, web pages or the like.

12 Claims, 2 Drawing Sheets

Figure 1:
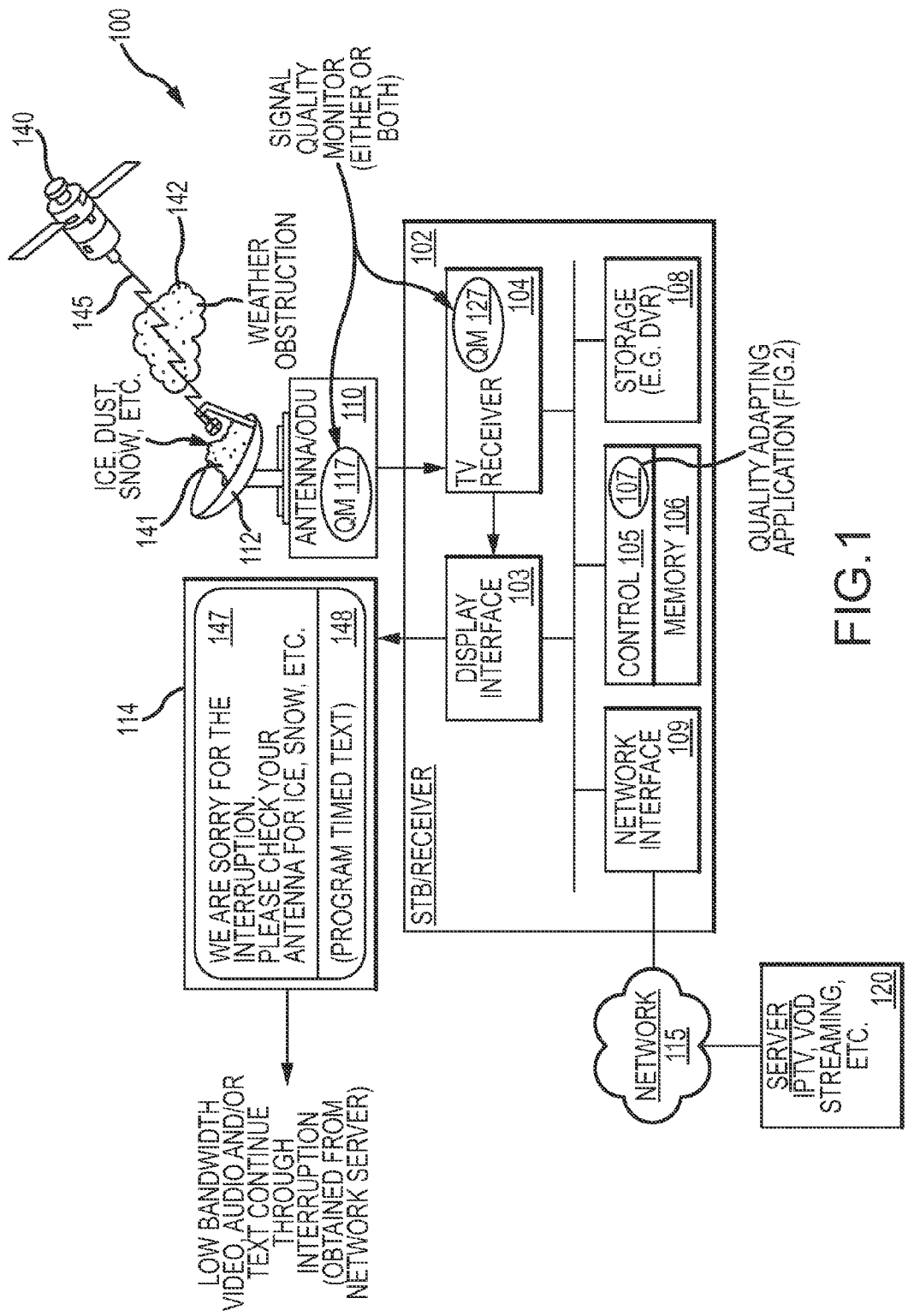

(51) Int. Cl.
*H04N 21/44* (2011.01)
*H04N 21/4402* (2011.01)
*H04N 21/462* (2011.01)
*H04N 21/61* (2011.01)
*H04N 21/24* (2011.01)
*H04N 21/6338* (2011.01)
*H04N 21/442* (2011.01)
*H04H 20/24* (2008.01)
*H04H 60/11* (2008.01)

(56) References Cited

U.S. PATENT DOCUMENTS

| | | | | |
|---|---|---|---|---|
| 2004/0107436 A1* | 6/2004 | Ishizaki | H04H 20/06 | 725/36 |
| 2006/0033846 A1* | 2/2006 | Ozaki | H04N 5/4401 | 348/731 |
| 2008/0320545 A1* | 12/2008 | Schwartz | H04N 7/17318 | 725/135 |
| 2009/0013351 A1* | 1/2009 | Liao | H04N 7/17318 | 725/39 |
| 2009/0193482 A1* | 7/2009 | White | H04N 7/17318 | 725/110 |
| 2010/0203823 A1* | 8/2010 | Apaar | H04H 20/20 | 455/3.06 |
| 2010/0325545 A1* | 12/2010 | Bennett | G06F 3/1415 | 715/716 |
| 2011/0055874 A1* | 3/2011 | Libin | H04W 4/00 | 725/62 |
| 2011/0126249 A1* | 5/2011 | Makhlouf | H04N 7/17318 | 725/109 |
| 2011/0299836 A1 | 12/2011 | Amsterdam et al. | | |
| 2013/0042280 A1* | 2/2013 | Chen | H04N 21/44209 | 725/68 |
| 2013/0291026 A1* | 10/2013 | Yu | H04N 21/6131 | 725/62 |
| 2013/0342759 A1* | 12/2013 | Sahashi | H04N 5/268 | 348/460 |
| 2015/0040172 A1* | 2/2015 | Zelesko | H04N 21/4622 | 725/110 |
| 2015/0179221 A1* | 6/2015 | McCarthy, III | G11B 27/034 | 386/248 |
| 2016/0021424 A1* | 1/2016 | Andersson | H04N 21/4383 | 725/110 |

* cited by examiner

PROVIDING UN-INTERRUPTED PROGRAM VIEWING EXPERIENCE DURING SATELLITE SIGNAL INTERRUPTIONS

TECHNICAL FIELD

The following discussion generally relates to reception of broadcast television programs, such as the reception of digital broadcast satellite (DBS) or other television broadcasts. More particularly, the following discussion relates to systems, methods and devices to maintain at least some of the content stream for the user even when broadcast signal reception is weak or unavailable.

BACKGROUND

Most television viewers receive their television programming through a cable, direct broadcast satellite (DBS), IPTV or similar subscription-based service. To that end, television service is usually broadcast from a cable, DBS or other content aggregator to multiple subscribers. The subscribers may then view received content as live broadcasts, and/or may store the content on digital video recorders (DVRs) or the like for later viewing. Some viewers may also placeshift received content from their homes or other access points to mobile phones, tablets or other devices for remote viewing.

One challenge that arises frequently is that that weather and other localized factors can affect reception of television broadcasts. DBS antennas, in particular, can perform poorly if dust, snow, ice or other environmental effects are allowed to accumulate. DBS subscribers will, for example, often experience service interruptions during stormy weather as accumulations of snow, dust or the like block the antenna's proper reception of broadcast signals. These interruptions may continue until the subscriber physically clears the obstructions from the antenna. While these interruptions are usually not difficult to repair, they can be annoying, particularly when they cause outages in the middle of a sporting match or other live program that is of interest to the viewer.

It is therefore desirable to reduce the effects of temporary outages in DBS, cable or other broadcast television service. Various desirable features and characteristics will become apparent from the subsequent detailed description and the appended claims, taken in conjunction with the accompanying drawings and this background section.

BRIEF SUMMARY

Various embodiments relate to systems, devices and/or methods to obtain a lower-quality replacement when the reception of a direct broadcast satellite (DBS) or other broadcast television signal becomes weak or unavailable due to weather or other circumstances. The received broadcast television signal is monitored by a receiver, antenna, outdoor unit or the like. When the received broadcast signal becomes weak or unavailable, the television receiver obtains a lower quality replacement for received broadcast signal from an alternate source to thereby continue the playback of the television program. Lower quality alternatives may include lower quality video streams, audio streams, text tickers, web pages or the like.

Some embodiments relate to methods executable television receivers. The method suitably comprises receiving a broadcast television signal that encodes a television program at the television receiver; decoding the broadcast television signal for playback by the television receiver; monitoring a quality of the received broadcast television signal; and, when the quality of the received broadcast signal degrades, the television receiver obtaining a lower quality replacement for received broadcast signal from an alternate source to thereby continue the playback of the television program.

Other embodiments provide television receivers comprising a processor, memory and appropriate input/output features, wherein the processor of the television receiver is configured to execute the various processes described herein.

Still other embodiments relate to television receiver systems and devices that may interact with an antenna, an outdoor unit (ODU) and/or the like.

Various other embodiments, aspects and other features are described in more detail below.

BRIEF DESCRIPTION OF THE DRAWING FIGURES

Figure 2:
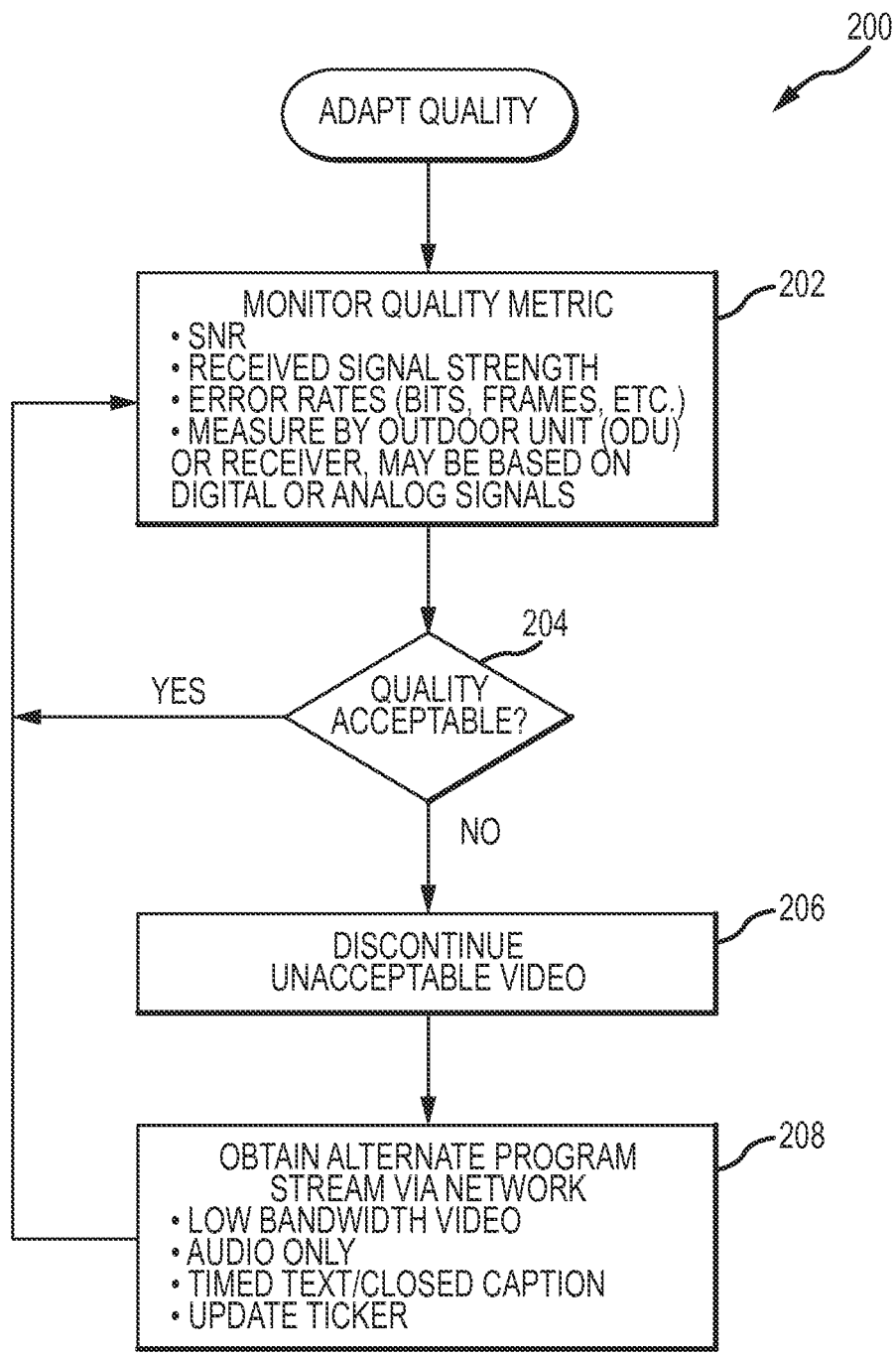

Exemplary embodiments will hereinafter be described in conjunction with the following drawing figures, wherein like numerals denote like elements, and FIG. 1 is a block diagram of an exemplary television receiver system; and FIG. 2 is a flowchart of an exemplary process to adapt the quality of the service provided to the viewer during temporary service outages.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

The following discussion describes various systems, devices and methods for improving the television viewing experience when signal reception degrades due to weather, dust or other factors. Although is particularly useful with direct broadcast satellite (DBS) systems that can experience degraded signal quality during periods of adverse weather (e.g., dust storms, snow, ice, dense cloud cover, rain, etc.), equivalent embodiments could be used with any sort of cable, IPTV, terrestrial broadcast and/or other forms of television distribution.

Generally speaking, the set top box or other television receiver (see FIG. 1) is able to detect when the satellite or other broadcast signal is relatively weak or otherwise unavailable. The antenna/outdoor unit (ODU) may have circuitry for detecting analog or digital signal strength, signal to noise ratios, signal presence or absence, and/or any other signal quality metric as desired. Alternatively, signal quality may be measured within the STB or other television receiver itself.

When the signal quality is unacceptably poor (e.g., when the signal is weak or non-existent), the television receiver obtains a lower-quality signal from a network server or other source other than the broadcast signal. This allows the program stream to continue from the standpoint of the viewer, albeit at a lower quality. Even if the quality of the stream degrades, this would generally be preferable to no signal at all. The "lower quality signal" may refer to a lower quality video stream (e.g., a stream having a bit rate, frame rate, resolution, etc. that is less than broadcast quality), an audio-only stream, a timed text/closed caption stream, an "event ticker" that describes continuing events, a web page, and/or any other content obtained via the Internet or another source other than the then-weakened broadcast channel.

If satellite service should degrade as the viewer is watching a live sporting match, for example, the details of the match could nevertheless be obtained from an internet or other network server and provided (as text, graphics, audio and/or lower bandwidth video) on a display to the viewer until satellite service is restored. This content could be obtained by a web browser application or the like executing on the STB/receiver device. If the service is discontinued due to snow, ice, dust or other factors that are within the viewer's control, a message may be provided on the display recommending that the user take remedial action as appropriate (e.g., to clean the snow or dust off of the antenna).

These techniques, devices and systems are particularly useful for broadcasts of live events, such as sporting events, but they could be equivalently used for any sort of television programming. Also, the concepts herein are not limited to weather-based outages, but could be equivalently applied to planned or unplanned service outages of any sort, including routine maintenance by the television service provider, solar blackouts and/or the like.

Turning now to the drawing figures and with initial reference to FIG. 1, an example system 100 for receiving broadcast television signals suitably includes a set top box (STB) or other television receiver 102 that provides decoded television signals to a television or other display 114. In the example of FIG. 1, receiver 102 is a conventional STB used to receive direct broadcast satellite (DBS) programming transmitted via a satellite 140. In this example, television signals 145 that encode one or more television programs are broadcast from a satellite 140 and received at an antenna 112. In the DBS setting an outdoor unit (ODU) no may be provided for controlling the antenna 112 and for providing an interface to one or more receivers 102, as desired. Other embodiments may be based upon cable, terrestrial, IPTV or other broadcasts, as appropriate.

The example receiver 102 illustrated in FIG. 1 suitably includes a television receiver module 104 that receives and decodes television programming provided in signal 145. Decoded television signals are provided to a display interface 103 that provides output signals that generate imagery on display 114. Receiver 102 performs various functions (including those described below) under the control of processor 105. Typically, processor 105 controls the operation of receiver 102 by executing software or firmware instructions that reside in memory 106 or the like. Receiver 102 is also shown in FIG. 1 to include an interface 109 to a network 115. Network 115 may be the Internet or another wide area network, as accessed through an Ethernet, Wi-Fi or similar interface 109, as appropriate. Many receivers 102 also provide a digital video recorder (DVR) or similar program storage 108, if desired.

As noted above, television broadcast signals 145 may be interrupted or degraded for any number of reasons. Inclement weather such as rain, snow, or dust, for example, can interfere with reception of signal 145. Accumulations 141 of ice, snow, dust or the like can build up on antenna 141, for example. Alternately, heavy clouds, dust, smoke, pollution, rain or other environmental effects 142 in the air can prevent effective reception of signal 145. Reception of signal 145 may be disrupted for many other reasons, including solar blackouts or other solar activity, planned or unplanned maintenance by the broadcaster, and/or any number of other factors.

To that end, receiver 102 detects when signal 145 is too weak to continue effective reception. The detection function may be carried out, for example, by a quality adapting application 107 that resides in memory 106 and that is executed by processor 105. Typically, quality adapting application 107 communicates with a signal quality monitor 117 and/or 127, as appropriate. Quality monitor circuitry may be located within the receiver 102 (e.g., in receiver module 104), in the antenna/outdoor unit 110, or elsewhere in system 100 as desired. In various embodiments, a signal strength indicator 117 in ODU 110 reports the intensity, SNR or other factors relating to the strength of received signal 145 back to quality adapting application 107. Alternatively, the signal strength measuring/monitoring function may be performed within receiver module 104 or elsewhere in receiver 102, as desired.

If the strength of the received television broadcast signal 145 degrades below an acceptable level, then receiver 102 obtains and presents a lower quality replacement 148 to the viewer. The acceptable level may be defined by a numeric threshold in some embodiments. That is, application 107 could compare the then-current signal strength with one or more previously-determined threshold values, and take appropriate remedial action when the strength is too weak to continue effective presentation of the received programming. When broadcast television signals 145 are too weak to be useful, for example, receiver 102 may alternately obtain a lower-quality stream 148 from a network server 120. Server 120 may be an internet service that provides streaming audio, video, text or other content as appropriate to continue at least some portion of the program content to alleviate viewer frustration when the full program stream is not available. That is, even if full resolution video may not be receivable via signals 145, receiver 102 may nevertheless provide some content to display 114 by requesting a replacement stream from network server 120. The replacement stream may be provided from a video-on-demand (VOD) source, a remote storage digital video recorder (RSDVR), a source of IP television (IPTV), a network file server, or the like.

Replacement streams may vary from embodiment to embodiment. In some implementations, the replacement stream provided by server 120 is a video stream that has a lower bit rate, frame rate, resolution and/or the like in comparison to programming provided by signals 145. The lower quality stream may be more readily transmittable on network 115, since the lower quality stream should consume less bandwidth than a full resolution video stream. As noted above, the replacement stream could be an audio-only stream in some implementations. Still other implementations could provide a scrolling text window (e.g., with closed caption or other timed text data from the broadcast), a web page with static or dynamic information, or any other information as desired.

Receiver 102 therefore provides an alternate program stream to display 114 when broadcast signal 145 is not available due to weather or other factors. The alternate stream may have lower quality than would otherwise be available from signal 145, but it will prevent a total interruption of all information to the viewer. If the interruption in signal 145 is caused by snow, ice, dust or other debris 141 accumulating on antenna 112, a message 147 may be generated on display 114 to instruct the viewer to clean the antenna 112, as desired.

Turning now to FIG. 2, an example process 200 to respond to changes in signal 145 suitably includes the broad functions of obtaining a quality metric (function 202), determining if the signal quality is acceptable (function 204), and if not, discontinuing the unacceptable video (function 206) and instead obtaining a different program stream (e.g., a lower quality program stream) from an alternate source (function 208). These broad functions may be supplemented, modified or differently arranged in any manner. In various embodiments, the functions of process 200 are performed by software or firmware instructions 107 residing in memory 106 and executed by processor 105; equivalent embodiments may implement some or all of the functions in other ways.

The strength (or other quality) of signal 145 may be measured and/or monitored in any manner (function 202). In various embodiments, received signal strength indicators (RSSIs) in ODU 110, antenna 112 and/or receiver 104 measure the signal-to-noise ratio (SNR) or other indicia of the strength of the received analog signal. This information may be provided to application 107 as appropriate. Other embodiments may additionally or alternately consider digital signal factors, such as bit or frame error rates or other factors as appropriate. Any number of digital and/or analog metrics could correlate to the strength of signal 145, and may be considered herein.

Received signal strength measurements are considered as appropriate (function 204) to determine if the then-currently-received signal 145 is acceptable to continue providing television programming. In many embodiments, the metric data received in function 202 is compared to a suitable threshold value. The threshold may be empirically determined, derived from previous measurements, or determined in any other manner. The strength of signal 145 could be equivalently measured in more absolute (e.g., "present or absent") terms rather than more quantifiable numeric terms, as desired. That is, function 204 could simply determine if the signal 145 is present or absent in some embodiments.

If signal 145 maintains sufficient strength, then receiver 102 continues to receive the signal 145, to decode television programming from the received signal 145, and to provide the decoded programming for presentation on display 114. If the signal strength is determined to be weak or non-existent (as appropriate), however, then receiver 102 suitably discontinues presentation of the programming obtained from signal 145 (function 206) and instead obtains an alternate program stream from an alternate source 120 (function 208), as desired.

Alternate programming may be obtained in any manner. As noted above, alternate programming may be obtained from a network server 120 on network 115, or from any other source. In various embodiments, receiver 102 provides server 120 with a presentation time stamp (PTS) or other indicator of a point in time that signal 145 was discontinued so that the server 120 can provide alternate programming that starts at an appropriate point in time. Alternate programming may be provided in any sort of streaming format (e.g., real time streaming protocol (RTSP) or the like), and/or programming may be provided as one or more data files that could be passed using hypertext transport protocols (HTTP) or the like. Various adaptive media streaming techniques, for example, are based upon HTTP retrieval. Any sort of file based, streaming, static or other protocols may be used to deliver alternate content to receiver 102, as desired.

As noted above, the alternate programming may be provided in any desired format. Some embodiments may provide streaming video content that continues the video feed from program signal 145. Such programming may be provided with reduced bit rate, frame rate, resolution or other quality in comparison to signal 145, however, to conserve bandwidth on network 115 and to facilitate fast transfer and decoding of the substitute stream. Other embodiments may provide only an audio stream so that the viewer can continue to listen to the program during the interruption in signal 145. The alternate audio may be audio from the program feed itself, or from another source (e.g., a radio broadcast of the same event, or a human announcer that provides a play-by-play or other description of the suspended program). Still other embodiments may provide closed caption data or other timed text, or a static or dynamic web page that is associated with the televised event. A live sports broadcast, for example, could be temporarily replaced with a web page showing live updates if the broadcast signal 145 becomes unavailable for any reason. As noted above, some embodiments may additionally provide a message 417 that instructs the viewer to remove ice, snow, dust or other debris from the antenna 112 if conditions warrant.

Signal 145 may be monitored while the alternate stream is being provided so that television programming may be restored when signal 145 returns, as appropriate.

As used herein, the word "exemplary" means "serving as an example, instance, or illustration." Any implementation described herein as exemplary is not necessarily to be construed as preferred or advantageous over other implementations.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable on a television receiver, the method comprising:
   receiving a broadcast television signal that encodes a television program at the television receiver;
   decoding the broadcast television signal for playback of a video stream by the television receiver;
   monitoring a quality of the received broadcast television signal; and
   when the quality of the received broadcast signal degrades so that the video stream is no longer able to be played back by the television receiver, obtaining a lower quality replacement comprising only the audio portion of the received broadcast signal from an alternate source to thereby continue the playback of the audio portion of the television program even though the quality of the received broadcast signal is degraded.

2. The method of claim 1, wherein the alternate source is a network server that communicates with the television receiver via a network, and wherein the obtaining comprises obtaining the lower quality replacement as a media stream of the audio portion that is provided to the television receiver over the network from the network server.

3. The method of claim 1, wherein the broadcast television signal is a direct broadcast satellite signal received via a satellite antenna.

4. The method of claim 3, wherein the quality of the received broadcast signal degrades in response to adverse weather conditions blocking the received broadcast signal from the satellite antenna.

5. A television receiver comprising a processor, memory and input/output interfaces, wherein the processor is configured to:
   receive a broadcast television signal that encodes a television program;

decode the broadcast television signal for playback by the television receiver;

monitor a quality of the received broadcast television signal; and when the quality of the received broadcast signal degrades, obtain a lower quality replacement for the received broadcast signal that encodes only an audio portion of the television program from an alternate source to thereby continue the playback of the audio portion of the television program even though the quality of the received broadcast signal is degraded.

6. The television receiver of claim 5, wherein the alternate source is a network server that communicates with the television receiver via a network, and wherein the obtaining comprises obtaining the lower quality replacement as a media stream of the audio portion that is provided over the network from the network server.

7. The television receiver of claim 6, wherein the alternate source is a network server that communicates with the television receiver via a network.

8. The television receiver of claim 5, wherein the quality of the received broadcast television signal degrades in response to adverse weather conditions blocking the received broadcast television signal from a satellite antenna of a direct broadcast satellite television system.

9. A television receiver device comprising:
   a television tuner configured to receive a broadcast television signal from an antenna and to decode an audio portion and a video portion of a television program encoded in the broadcast television signal;
   a display interface configured to provide the decoded television program to a display for presentation to a viewer; and
   a processor configured to monitor a quality of the received broadcast television signal and, when the quality of the received broadcast signal degrades so that the video portion of the television program can no longer be provided for presentation to the viewer, to obtain an audio-only stream encoding the audio portion of the television program as a lower quality replacement for the received broadcast signal from an alternate source to thereby continue the playback of the audio portion of the television program even though the quality of the received broadcast signal is degraded.

10. The television receiver device of claim 9 further comprising a network interface configured to communicate on a digital network, wherein the alternate source is a network server that communicates with the television receiver device via the network, and wherein the processor obtains the lower quality replacement as a media stream provided over the network from the network server.

11. The television receiver device of claim 9 further comprising a network interface configured to communicate on a digital network, wherein the alternate source is a network server that communicates with the television receiver device via the network, and wherein the processor obtains the lower quality replacement as the audio-only stream provided over the network from the network server that provides the same audio content as the television program encoded in the broadcast television signal.

12. The method of claim 9, wherein the antenna is a satellite antenna and wherein the broadcast television signal is a direct broadcast satellite signal received via the satellite antenna, and wherein the quality of the received broadcast signal degrades in response to adverse weather conditions blocking the received broadcast signal from the satellite antenna.

\* \* \* \* \*